United States Patent
Thompson et al.

(10) Patent No.: US 8,630,149 B2
(45) Date of Patent: Jan. 14, 2014

(54) MARINE SEISMIC SOURCE

(75) Inventors: Martin Thompson, Cambridgeshire (GB); Mark Francis Lucien Harper, Cambridgeshire (GB)

(73) Assignee: BP Exploration Operating Company Limited, Middlesex (GB)

(*) Notice: Subject to any disclaimer, the term of this patent is extended or adjusted under 35 U.S.C. 154(b) by 339 days.

(21) Appl. No.: 12/995,763

(22) PCT Filed: Jun. 17, 2009

(86) PCT No.: PCT/GB2009/050690
§ 371 (c)(1),
(2), (4) Date: Dec. 2, 2010

(87) PCT Pub. No.: WO2009/153595
PCT Pub. Date: Dec. 23, 2009

(65) Prior Publication Data
US 2011/0085422 A1    Apr. 14, 2011

(30) Foreign Application Priority Data

Jun. 18, 2008  (GB) .................................. 0811123.9
Jun. 27, 2008  (GB) .................................. 0811764.0

(51) Int. Cl.
*G01V 1/13*       (2006.01)
*G01V 1/135*      (2006.01)
(52) U.S. Cl.
CPC . *G01V 1/13* (2013.01); *G01V 1/135* (2013.01)
USPC ........................................................ 367/143

(58) Field of Classification Search
USPC ........... 367/141–143, 179; 181/110, 121, 142
See application file for complete search history.

(56) References Cited

U.S. PATENT DOCUMENTS

| 4,142,171 A * | 2/1979 | Pickens .......................... 367/143 |
| 4,483,411 A | 11/1984 | Mifsud .......................... 181/120 |
| 5,233,570 A * | 8/1993 | Donskoy ........................ 367/142 |
| 5,491,306 A * | 2/1996 | Gram ............................. 181/106 |

OTHER PUBLICATIONS

International Search Report mailed Sep. 12, 2009, in Application No. PCT/GB2009/050690.

* cited by examiner

*Primary Examiner* — Krystine Breier

(57) ABSTRACT

A low frequency sound source has a radiating piston (3) of the order of a few meters across backed by a gas spring (13, 15) containing a fixed mass of gas. The gas pressure in the spring is kept at levels for which the natural frequency of the piston (3) loaded by the fluid (41) lies in the seismic band and may be as low as 0.5 Hz. The piston (3) is given an initial displacement and begins to oscillate. Its oscillations are sustained by an actuator (27, 29) whose drive signal is derived from the velocity of the piston (5) via a velocity or displacement sensor. The sound source is caused to perform a frequency sweep by gradually compressing the gas in the gas spring (13, 15) so that the spring becomes stiffer both because of the rising pressure and because of the reducing length of the gas spring spaces (13, 15). This double effect allows large changes in stiffness to be produced and hence allows the source to operate over at least three octaves of frequency.

25 Claims, 3 Drawing Sheets

Fig. 0001
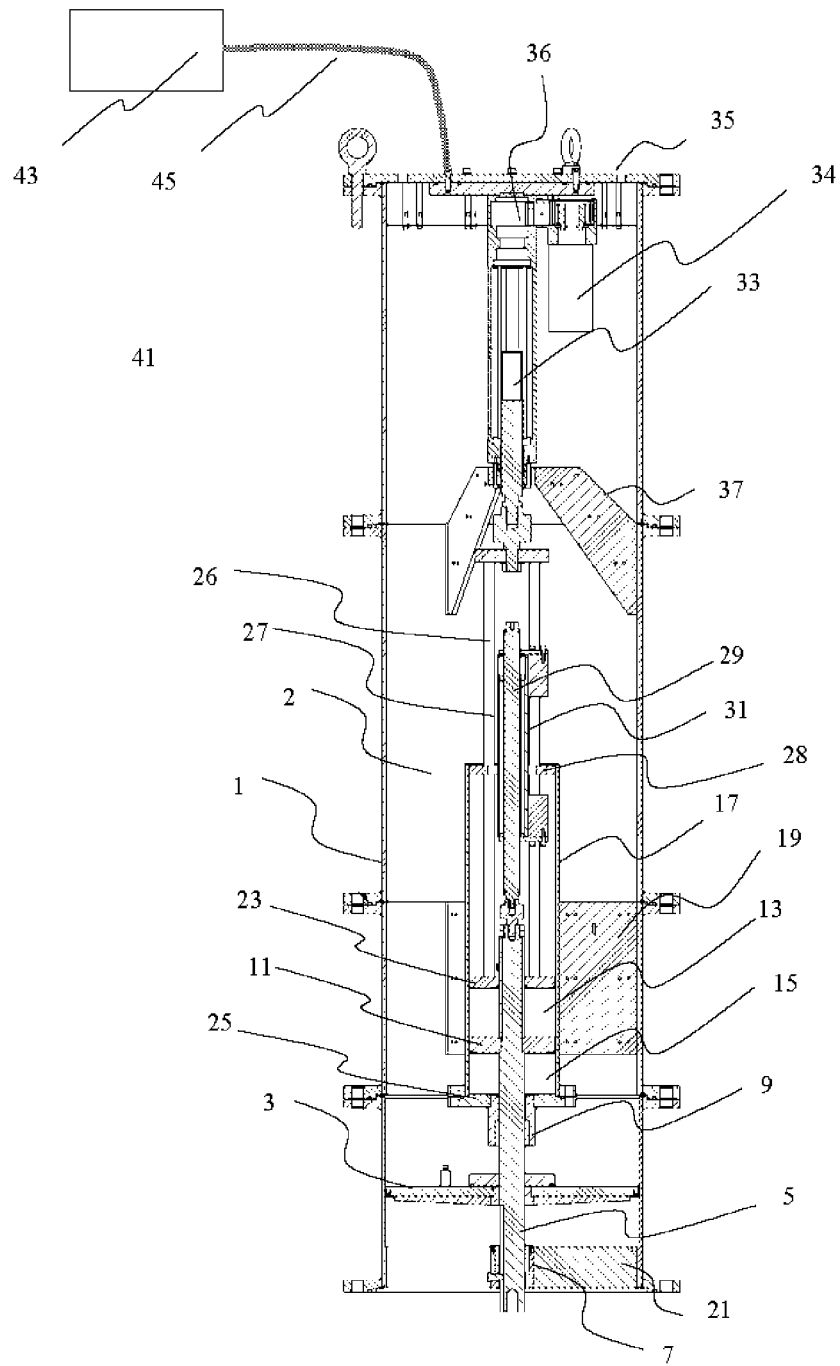

Fig. 0002
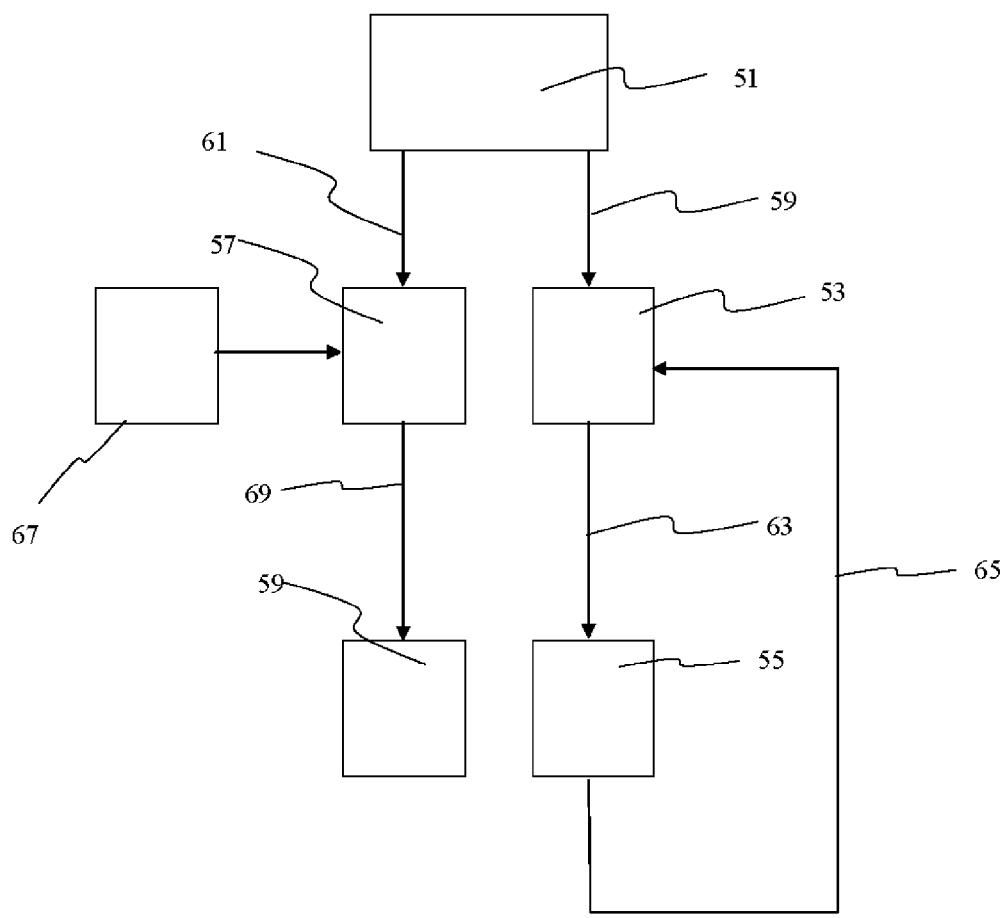

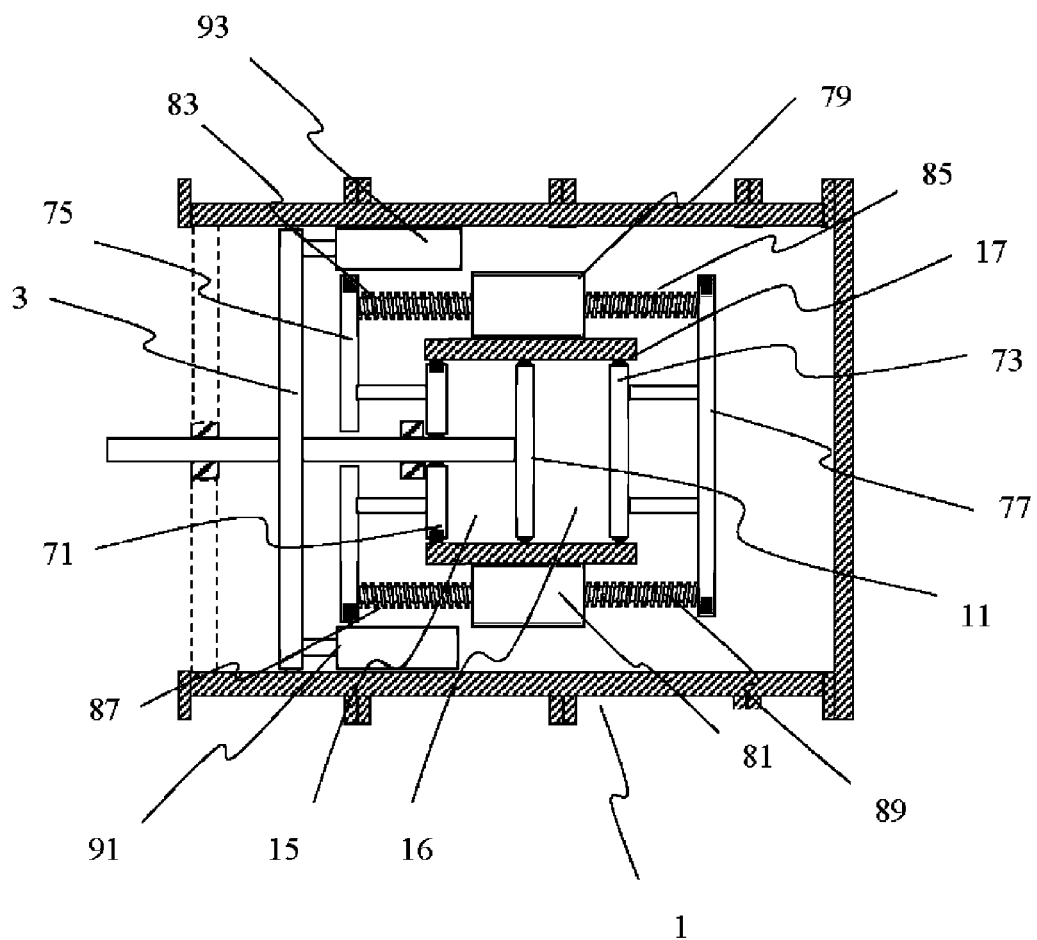
Fig. 0003

MARINE SEISMIC SOURCE

This invention relates to generating acoustic signals in water for marine seismic surveys.

During the course of seismic exploration there can arise a need to monitor seismic response down to very low frequencies. For example, the accuracy with which seismic data can be used to estimate the acoustic impedance of the subsurface as a function of depth or travel time is much improved by including very low frequencies in the inversion.

A number of different methods have previously been proposed, mainly but not exclusively relating to seismic surveys undertaken at sea (marine surveys). They include an underwater trombone ("Suggestions for the development of controlled frequency marine seismic source", O'Brien J T, *Geophysics* November 1986); hydraulically driven sources; ("Development of a hydraulic transducer for marine seismics", Bird J. M., Peacock J. H., Walker L. J. presented at SEG, Atlanta 1984; Cole, U.S. Pat. No. 3,394,775, Jul. 30, 1968; Ross, U.S. Pat. No. 3,578,102, May 11, 1971; Mifsud, U.S. Pat. No. 4,483,411, Nov. 20, 1984; Mifsud, U.S. Pat. No. 4,557,348, Dec. 10, 1985; Gram, U.S. Pat. No. 5,491,306, Feb. 13, 1996); devices based on giant magnetostriction ("Development of a New Improved Marine Vibrator Based on Terfenol-D", Bjflrn &sin-Helm, Saga Petroleum: Rune Tengham, EB Seatech; Ragnar Fritsvold, Norsk Hydro; and Per Anders Osterholt, Master Surveys, Norway, SEG Atlanta 1984); and an electrical vibrator (Newsletter of PGS Geophysical Inc, November 2005). U.S. Pat. No. 4,578,784 relates to a marine seismic source which is coupled to a hydraulic actuator and uses a variable spring system. U.S. Pat. No. 4,142,171 relates to a seismic source which varies the volume of gas within a chamber defined by the source in order to keep the frequency of the radiated signal constant.

None of the proposed methods is described as being capable of producing useful seismic signals at frequencies as low as 0.5 Hz.

According to the invention there is provided a marine seismic source for producing seismic signals over a band of frequencies the source comprising: a piston; means to vibrate the piston to generate the seismic signals; a gas spring acting on the piston; and means for varying the stiffness of the gas spring to vary the resonant frequency of vibration of the piston thereby varying the frequency of the seismic signals generated and radiated from the piston; characterised in that the means for varying the stiffness of the gas spring includes means to vary the length of a gas chamber of the gas spring so as to vary the pressure of the gas within the gas chamber.

By employing the invention the stiffness of the gas spring can be varied sufficiently to allow the source to produce very broad sweep signals, extending over at least three octaves of frequency, including very low frequencies of 0.5 Hz and below.

By allowing the spring-piston system to resonate, the forces required to excite the required amplitudes of motion of the piston are much smaller than would be the case if the piston were directly driven by an actuator.

In a preferred embodiment the gas chamber is sealed and holds a fixed mass of gas. The means to vibrate the piston may comprises an actuator which when not actuating the piston has a mechanical impedance which is lower than the mechanical impedance of the piston and gas spring so as not to impede the motion of the radiating piston.

The piston may be connected to a secondary piston moveable within the gas chamber. The size of the gas chamber may be varied by provision of a wall of the sealed gas chamber being moveable so as to vary the length of the sealed gas chamber. The length of the gas chamber being the dimension in the direction in which the secondary piston moves within the gas chamber. In an alternative embodiment opposing walls are moveable in synchrony. This enables the length of the chamber to be varied without changing the rest position of the piston and thus altering the buoyancy of the seismic source. This is important where the source is being towed behind a craft.

The or each moveable wall may be defined by a tertiary piston slidable against an adjacent wall or walls of the gas chamber so as to vary its length. The tertiary piston may have an inner periphery forming a gas tight seal with a shaft connected to the secondary piston and extending out of the gas chamber so as to allow movement of the tertiary piston and secondary piston relative to one another.

The or each tertiary piston is moved by an actuator having a high mechanical impedance relative to the gas spring. This prevents the or each tertiary piston from moving significantly as a result of the changes in pressure in the gas spring caused by motions of the secondary piston and thereby damping the oscillations of the radiating piston or modifying its frequency of oscillation.

In order that the source can generate a sweep of frequencies through the band, the source may include means to vary the length of the sealed gas chamber whilst the piston is vibrating. It is preferred that the piston has a diameter of at least one meter in order that the generated signal is sufficiently strong for the purposes of marine seismic surveys.

Equally, it is preferred that the source is capable of producing seismic signals over a band of frequencies covering at least three octaves, and that band includes frequencies of 0.5 Hz or lower.

The gas spring may be contained within a gas-filled shell, one wall of which being formed by the piston. In order that the piston is not prevented from oscillating at its lowest desired frequency, which may by 0.5 Hz or below, the volume of gas held within the shell is sufficiently large that the variation in pressure of the gas caused by movement of the piston is substantially smaller than the variation of pressure of the gas within the gas spring caused by movement of the secondary piston.

In order to amplify and maintain the vibration of the radiating piston, it is preferred that the source comprises a detector to detect displacement or velocity of the piston and including means for using an output signal from the detector to control the actuator acting on the piston.

The output signal of the said detector may be used to cause the actuator to apply a force to the piston that is proportional to and in the same direction as the velocity of the piston. Alternatively the actuator may be caused to apply a force to the piston that is of constant magnitude and in the same direction as the velocity of the piston. Applying a force to the piston that depends only on the velocity of the piston amplifies oscillations of the piston and gas spring at their resonant frequency and so the frequency of the output can be varied simply by varying the stiffness of the gas spring.

To initiate vibration of the piston, the source will preferably including means for initially displacing the piston from an equilibrium position and then releasing it.

This may be achieved by including means for causing gas to flow into or out of the shell. Alternatively, the means may cause gas to flow into or out of the gas chamber of the gas spring piston so as to prompt movement of the secondary piston, and thus of the (primary) piston. A further alternative is to apply a transient force to the piston using the aforementioned low-impedance actuator which thereafter is used to apply a force depending on the velocity of the radiating piston.

In order to retain the piston in the displaced position before initiating vibration, the source may comprise a remotely-operated latch and including means for releasing the latch.

The invention can also be expressed in terms of a method and therefore there is provided, in accordance with a second aspect of the invention, a method of generating seismic signals over a band of frequencies the method comprising vibrating a piston to generate the seismic signals; varying the stiffness of a gas spring which acts upon the piston to vary the resonant frequency of vibration of the piston thereby varying the frequency of the seismic signals generated and radiated out from the piston; vibrating the piston with a low impedance actuator to generate the seismic signals; controlling the low impedance actuator to impose a force on the said piston in the direction of the velocity of the piston.

The stiffness of the gas spring may be varied by varying the length of a gas chamber of the gas spring so that the stiffness of the gas spring varies by virtue both of the change in pressure of the gas it contains and of the change in length. This double effect allows very large changes in stiffness and hence in resonant frequency of the radiating piston and gas spring. The stiffness of the gas spring may also be varied whilst the piston is vibrating so as to radiate a sweep of frequencies throughout the band.

The invention will now be described by way of example with reference to the accompanying drawings in which:—

FIG. 1 is a cross section view of a seismic source for generating acoustic signals for a marine seismic survey;

FIG. 2 is a schematic of a control system to control movement of the piston; and FIG. 3 is a cross section view of an alternative embodiment of a seismic source.

In FIG. 1 an embodiment of the invention is immersed in water 41 which may for example be seawater. In FIG. 1, the device is contained within a gas-filled cylindrical shell 1 made of steel or other strong material. A radiating piston 3 of the order of a few meters in diameter is fixed to a rod 5 supported by linear bearings 7, 9 so that the rod 5 is free to move vertically. A circumferential sliding seal (not shown) prevents water ingress between shell 1 and radiating piston 3. The lower bearing 7 is supported from the shell 1 via three webs one of which 21 is shown shaded. The upper bearing 9 is supported by a gas-tight end-cap 25 which closes the lower end of the gas-spring cylinder 17. A gas-tight sliding seal between end cap 25 and rod 5 (not shown) prevents escape of gas from the cylinder 17. The cylinder 17 is supported from the shell 1 by three webs one of which 19 is shown shaded. Behind the piston 3 a secondary piston 11 is also fixed to the rod 5 and has a gas-tight sliding seal (not shown) around its outer circumference. The secondary piston 11 divides the gas within the gas spring cylinder 17 into two volumes 13, 15. The mass of gas in the spaces 13, 15 is fixed during operation. The upper end of the space 13 is closed by a tertiary piston 23 which has a gas-tight sliding seal (not shown) around its outer circumference and a second gas-tight seal between piston 23 and rod 5. The tertiary piston 23 is attached to a yoke 26 which is in turn attached to a powerful linear actuator 33 which presents a very high mechanical impedance compared to the mechanical impedance of the gas spring 13, 15. The actuator 33 incorporates a position sensor (not shown) which allows a control system to measure the position of the actuator 33 at any time in a manner well known to those versed in the art of industrial control systems and illustrated in FIG. 2. Thus the position of the tertiary piston 23 will be controlled by the actuator 33 and will not be affected by changes of pressure in the gas spring volume 13 resulting from oscillations of the radiating piston 3. The actuator 33 is driven by an electric motor 34 via a drive band 36. The yoke may be guided within the gas spring cylinder 17 by a collar 28 which is attached to the yoke 26 and is a sliding fit in the cylinder 17. The actuator 33 is supported by the upper end-cap 35 of the shell 1 and from the wall of the shell 1 by three webs one of which 37 is shown shaded. Within the yoke 26 and supported from it is an electric linear motor coil 27. A magnet rod 29 is guided through the coil 27 by plain bearings (not shown) and is attached to the upper end of the rod 5. An electric linear motor may be used because it has low mechanical impedance and so does not limit or impede the motion of the moving assembly 3, 5, 11, 29. The linear motor incorporates a position sensor (not shown) which allows a control system to measure the relative position of the actuator rod 29 and coil 27 at any time in a manner well known to those versed in the art of industrial control systems and illustrated in FIG. 2.

Before operation it should be ensured that the mass of gas in the volume 2 enclosed by the shell 1 is such that when stationary the piston 3 remains near the midpoint of its possible range of motion between the bearings 7,9 and is not close to either bearing 7, 9. This can be accomplished by pumping gas (for example air) into or out of the space 2 using a gas pump 43 via a tube 45. The pump 43 may be located on a tender vessel (not shown). During operation the actuator 33 is first retracted so that the tertiary piston 23 moves towards the top of the gas spring cylinder 17 and volumes 13, 15 are large and the gas pressure within them is low. The linear motor 27, 29 is then used to excite the rod 5 and pistons 3, 11 into motion so that sound is radiated from the piston 3 into the surrounding water 41. This may be done simply by producing a large initial displacement and then allowing the piston 3 to oscillate freely, or by applying a force proportional to the velocity of the piston 3 so that it becomes negatively damped and oscillates with increasing amplitude until the radiated energy causes sufficient loss of energy to limit the oscillations, or by applying a force proportional to the sign of the velocity of the piston 3 so that it becomes similarly negatively damped, or by a combination of these methods. Applying a velocity-dependent force may be accomplished using a simple feedback system from a velocity or position sensor attached to any part of the piston 3 or rod 5 in a manner well known to those versed in the art. The initial displacement of the piston 5 may be produced by applying a force with the linear motor 27, 29 or by temporarily withdrawing gas from the volume 2, latching the piston in its displaced position using a solenoid latch (not shown), returning the gas to the volume 2 and then releasing the latch. Alternatively it may be produced by raising the tertiary piston 23 so that the secondary piston 11 and hence the radiating piston 3 are displaced, latching the piston 3 as previously described, returning the piston 23 to its former position and then releasing the latch.

The piston 3 will be loaded by the water 41 in the manner well known to those versed in the art of acoustics and the effective moving mass will typically be several times the mass of the piston 3 together with the rod 5 the secondary piston 11 and the magnet rod 29. The angular frequency of oscillation of the rod 5 and pistons 5, 11 will be given with reasonable accuracy by the formula $$\omega = \sqrt{\frac{k_{13} + k_{15} + k_0}{m}} \qquad \text{[Math. 0001]}$$

Where m is the effective moving mass including the mass of the pistons 3, 11 and rods 5, 29 and the mass loading produced by the fluid 41, $k_{13}$ and $k_{15}$ are the stiffnesses of the gas volumes 13, 15, and $k_0$ is the stiffness of the gas contained in the space 2 within the shell 1 when compressed or rarified by the motions of the radiating piston 5. These are given to reasonable accuracy by the equation $$k = \frac{\gamma p A}{l} \qquad \text{[Math. 0002]}$$

In which g is the ratio of specific heats of the gas, p is the mean pressure of the gas, A is the area of the gas space normal to the axis of motion and l is the length of the gas space parallel to the axis of motion. The masses of gas in the spaces 13, 15 may be identical but their pressures and hence lengths will differ in that the pressure in the lower space 15 will be higher because of the weight of the rod 5 pistons 3 and 11 and magnet rod 29.

It is an important aspect of the design that the volume 2 of gas within the shell 1 is sufficiently large so that the stiffness that it presents to the piston 3 is not high enough to prevent the system oscillating at the lowest desired frequency.

Once the piston 3 has achieved the desired amplitude of motion, the actuator 33 is gradually extended pushing the tertiary piston downwards so that the pressure of the gas in the spaces 13, 15 is gradually increased and the length of the spaces 13, 15 is gradually reduced. It is evident from the second of the above equations that this simultaneous reduction in l and increase in p will lead to large changes in the stiffnesses $k_{13}$, $k_{15}$. This in turn will lead to substantial changes in the frequency of oscillation of the piston 5 so that the device is able to operate over a broad band of frequencies. Very low frequencies, of order 0.5 Hz, can be achieved by having the pressure in the gas volumes 13, 15 low at the beginning of operation and by having the lengths of the spaces 13, 15 long.

A suitable control system is illustrated in FIG. 2. A PC 51 communicates with two single-axis servo-controllers 53, 57 via serial communications links 59, 61. The controller 53 controls the high impedance actuator 33, 34, 36 shown here as block 55 via motor drive lines 63. The extension of the actuator 55 is fed back from an internal sensor (not shown, but for example a shaft encoder on its motor) to the servo-controller 53 via feedback cable 65. Likewise the controller 57 controls the low impedance actuator 27, 29 shown here as block 59 via motor drive lines 69. The position of the radiating piston is fed back from a position sensor 67 attached to the radiating piston 3 which may for example be a linear variable differential transformer to the controller 57.

The PC 51 is used to download control programs to the servo-controllers 53, 57. The program downloaded to the servo-controller 53, when initiated, may cause the high-impedance actuator 55 to execute a desired extension which may for example consist of an initial short high-acceleration phase, a phase of extension at constant velocity, a subsequent short deceleration phase in which the actuator 55 is brought to rest, a delay which may for example be ten seconds long, and a return-to-start phase in which the actuator extension is returned to its initial value and the program terminates execution. The total time interval between initiation and return to the initial extension value may be fixed and may be denoted by T.

The program downloaded to the servo-controller 57, when initiated, may cause the low-impedance actuator 59 to deliver an initial impulsive force to the piston rod 5 and may thereafter monitor the motion of the radiating piston 3 via the sensor 67 and cause the actuator 59 to apply a fixed level of force in the direction of the motion detected by the feedback 67 thereby effecting bang-bang control in a manner well known to those versed in the art of control system design. The force may then be reduced to zero and the program may terminate after a time interval after initiation also equal to T.

In normal operation the PC may cause the programs downloaded to the controllers 53, 57 to begin execution simultaneously. The combined effect will then be to cause the system to execute a frequency sweep as hereinbefore described.

A second embodiment of the invention is illustrated in FIG. 3. In this embodiment, instead of the air spring 15,16 being compressed by a single tertiary piston 23 it is compressed by a pair of tertiary pistons 71, 73 which are moved in opposite directions at the same time and at the same rate i.e. in synchrony. Thus whereas the mean position of the pistons 3,11 in the first embodiment of FIG. 1 gradually changes as the tertiary piston 23 moves, in the second embodiment the mean position of the pistons 3,11 does not change at the tertiary pistons 71, 73 move. This has the advantage that the buoyancy of the system does not change, which is a substantial advantage in a system which will typically be towed behind a vessel and whose depth of tow would be strongly affected by a change in buoyancy.

In the embodiment of FIG. 3 the tertiary pistons 71, 73 are driven by a pair of actuators 79, 81 via linkages 75, 77 which are mechanically very stiff. The actuators 79, 81 have very high mechanical impedance so that the positions of the tertiary pistons 71, 73 are governed solely by the position commands sent to the actuators 79, 81 by the control system of FIG. 2 and are negligibly affected by the pressure variations of the gas spring volumes 13, 15. The actuators 79, 81 may for example be servomotors combined with gearboxes. The actuators 79, 81 drive the linkages 75, 77 via left-handed ball screws 83, 87 and right-handed ball screws 85, 89 so that when the actuators 79, 81 rotate anticlockwise the tertiary pistons 71, 73 are drawn inwards and compress the gas spring 15, 16 and when the actuators 79, 81 rotate clockwise the tertiary pistons 71, 73 are drawn outwards and expand the gas spring 15, 16.

A second difference between the first embodiment of FIG. 1 and the second embodiment of FIG. 3 is that whereas in FIG. 1 the low-impedance actuator 29, 31 is supported from a yoke 26, 28 driven by the high-impedance actuator 33, 34, 36, in FIG. 3 there are at least two low impedance actuators 91, 93 supported directly by the casing 1 and acting directly on the radiating piston 3.

Overall the embodiment of FIG. 3 allows a simpler and more compact mechanical coupling between the high impedance actuators 79, 81 and the tertiary pistons 71, 73 than does the embodiment of FIG. 1. However it requires at least two high impedance actuators 79, 81 and at least two low impedance actuators 91, 93. These must be placed at regular intervals of azimuth around the axis of the device. For example if two actuators are used they must be separated by 180°. The high impedance actuators must always move in synchrony with each other to prevent the tertiary pistons 71, 73 skewing in the bore of the air spring cylinder 17. Similarly the low impedance actuators 91, 93 must always impose identical forces on the piston 3 to avoid skewing the piston 3.

The invention claimed is:

1. A marine seismic source for producing seismic signals over a band of frequencies the source comprising:
   a piston;
   means to vibrate the piston to generate the seismic signals;
   a gas spring acting on the piston; and
   means for varying a stiffness of the gas spring to vary a resonant frequency of vibration of the piston thereby varying a frequency of the seismic signals generated and radiated from the piston;

wherein the means for varying the stiffness of the gas spring
includes means to vary the length of a gas chamber of the gas spring to cause a change in the pressure of the gas within the gas chamber, the change in length of the gas chamber and the change in pressure of the gas within the gas chamber both causing the frequency of the seismic signals to sweep over a frequency band.

2. The marine seismic source of claim 1 wherein the means to vibrate the piston comprises an actuator which when not actuating the piston has a mechanical impedance which is lower than the mechanical impedance of the piston and gas spring.

3. The marine seismic source of claim 1 in which the piston is rigidly connected to a secondary piston moveable within the gas chamber.

4. The marine seismic source of claim 3 wherein a wall of the gas chamber is moveable so as to vary the length of the gas chamber.

5. The marine seismic source of claim 2 wherein opposing walls of the gas chamber are moveable.

6. The marine seismic source of claim 5 wherein the opposing walls are moved by one or more actuators in synchrony.

7. The marine seismic source of claim 4
wherein the movable wall or each moveable wall are defined by a tertiary piston.

8. The marine seismic source of claim 7 wherein the tertiary piston has an outer periphery forming a gas tight seal with an adjacent wall of the chamber and an inner periphery forming a gas tight seal with a shaft connected to the secondary piston and extending out of the gas chamber to allow movement of the tertiary piston and secondary piston relative to one another.

9. The marine seismic source of claim 8 wherein the tertiary piston is moved by an actuator having high mechanical impedance relative to the gas spring.

10. The marine seismic source of claim 1, further including means to vary the length of the gas chamber whilst the piston is vibrating so as to cause the piston to generate and radiate a signal comprising a sweep of frequencies.

11. The marine seismic source of claim 1 wherein the piston has a diameter of at least one meter.

12. The marine seismic source of claim 11 wherein the gas spring is held within a gas-filled shell one wall of which is formed by the piston.

13. The marine seismic source of claim 12 wherein the volume of gas held within the shell is sufficiently large that the variation in pressure of the gas caused by movement of the piston is substantially smaller than the variation of pressure of the gas within the gas spring caused by movement of a secondary piston rigidly connected to the piston.

14. The marine seismic source of claim 1 comprising a detector to detect displacement or velocity of the piston and means to control an actuator acting on the piston based on the detected changes in displacement and/or velocity of the piston.

15. The marine seismic source of claim 14 wherein the actuator is caused to apply a force to the piston that is proportional to and in the same direction as the velocity of the piston.

16. The marine seismic source of claim 15 wherein the said actuator is caused to apply a force to the piston that is of constant magnitude and in the same direction as the velocity of the piston.

17. The marine seismic source of claim 1, further including means for initially displacing the piston from an equilibrium position and then releasing it.

18. The marine seismic source of claim 17 wherein in which the means for initially displacing the radiating piston includes means for causing gas to flow into or out of the gas-filled shell.

19. The marine seismic source of claim 17 wherein the means for initially displacing the radiating piston including means for producing the initial displacement by causing gas to flow into the gas chamber of the gas spring piston.

20. The marine seismic source of claim 17 wherein the means to vibrate the piston to generate seismic signals also initially displaces the piston from the equilibrium position.

21. The marine seismic source of claim 17 wherein the piston is held in a displaced position by a remotely-operated latch, and further including means for releasing the latch to allow the piston to start oscillating.

22. A method of generating seismic signals over a band of frequencies the method comprising:
vibrating a piston to generate the seismic signals; and
varying a stiffness of a gas spring to vary a resonant frequency of vibration of the piston and gas spring thereby varying a frequency of the seismic signals generated and radiated from the piston,
wherein the stiffness of the spring is varied by varying the length of a chamber of the gas spring so as to vary the pressure of gas held within the gas chamber, the varying of the length of the gas chamber and the change in pressure of the gas within the gas chamber both causing the frequency of the seismic signals to sweep over a frequency band.

23. The method of claim 22 wherein the stiffness of the gas spring is varied whilst the piston is vibrating so as to radiate a sweep of frequencies.

24. A marine seismic source suitable for producing seismic signals over a band of frequencies the source comprising:
a radiating piston;
a gas spring of variable length acting on the radiating piston and holding a fixed mass of gas;
a secondary piston moveable within the gas chamber, the secondary piston rigidly connected to the radiating piston;
means for varying a stiffness of the gas spring by varying its length to vary a pressure in a gas chamber of the gas spring;
an actuator to vibrate the piston to generate the seismic signals; and
a control system that causes the actuator to impose a force on the said piston in the direction of the velocity of the piston.

25. A marine seismic source for producing seismic signals over a band of frequencies the source comprising:
a piston;
means to vibrate the piston to generate the seismic signals;
a gas spring acting on the piston;
a secondary piston rigidly connected to the piston, the secondary piston moveable within the gas chamber; and
means for varying a stiffness of the gas spring to vary a resonant frequency of vibration of the piston thereby varying a frequency of the seismic signals generated and radiated from the piston,
wherein the means for varying the stiffness of the gas spring includes means to vary the length of a gas chamber of the gas spring to cause a change in the pressure of the gas within the gas chamber.

* * * * *